Figure 2:
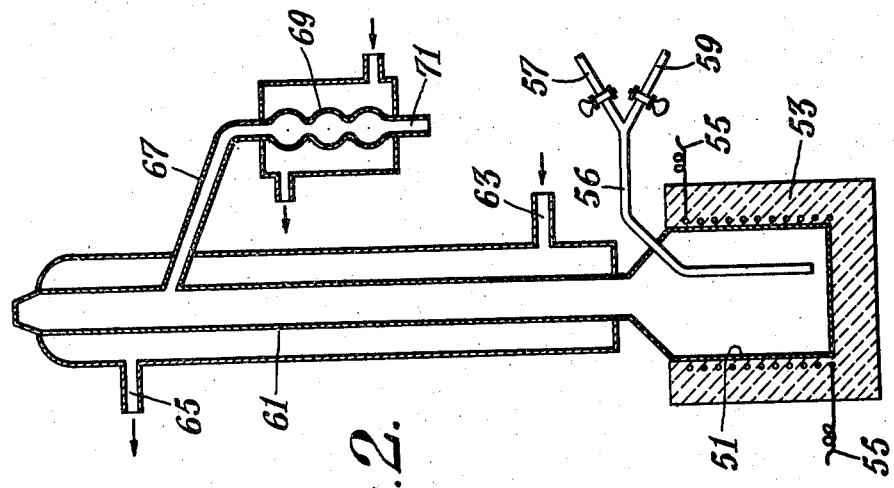

Nov. 2, 1948.

C. E. STAFF 2,453,044

PROCESS FOR PRODUCING CYCLOPENTADIENE
AND ITS HOMOLOGUES

Filed Aug. 11, 1939

INVENTOR
CHARLES E. STAFF
BY
*C. C. Scheffler*
ATTORNEY

Patented Nov. 2, 1948

2,453,044

UNITED STATES PATENT OFFICE 2,453,044

PROCESS FOR PRODUCING CYCLOPENTADIENE AND ITS HOMOLOGUES

Charles Eugene Staff, Charleston, W. Va., assignor to Carbide and Carbon Chemicals Corporation, a corporation of New York Application August 11, 1939, Serial No. 289,590

15 Claims. (Cl. 260—666)

This invention relates to the thermal depolymerization or cracking of dicyclopentadiene and its homologues; and more especially it concerns a process for the continuous production of cyclopentadiene and its homologues by a rapid depolymerization of the corresponding dimer.

Cyclopentadiene, boiling at 41° C., is formed in the cracking of various hydrocarbon mixtures such as natural gas, and hydrocarbon oils and gases derived from natural deposits, and from the high temperature treatment of coal, oil shale, and the like. The cyclopentadiene readily polymerizes to the dimer, and in some degree to the trimer and higher polymers. When these cyclopentadiene polymers are heated they crack to the monomer slowly, while a considerable portion further polymerizes to form resins. This difficulty becomes intensified in commercial practice because of the longer heating period involved. Liquid phase depolymerization of dicyclopentadiene at elevated temperatures and pressures produces resins. Since cyclopentadiene, because of its extremely high chemical reactivity, is well adapted for use in the production of many chemical products, any process that permits its production from readily available raw materials, with high yields and efficiencies, becomes industrially important.

Among the more important objects of the invention are: to provide for the depolymerization of dicyclopentadiene and its homologues at commercially feasible rates; to provide for the rapid depolymerization of the aforesaid dienes while preventing or retarding the formation of higher polymers; and to provide for the production of cyclopentadiene from crude mixtures containing these dienes and other hydrocarbons.

The present invention is based in important part upon the discovery that high yields of cyclopentadiene and its homologues may be secured by a rapid, continuous depolymerization of the corresponding dimer, while the latter is in a highly dilute or dispersed form—the resultant monomer being quickly removed from the high temperature zone substantially as rapidly as formed, after a brief exposure at the depolymerization temperature.

According to the invention, dicyclopentadiene, or the dimer of a homologue of cyclopentadiene, or a mixture containing such a dimer, is rapidly and continuously diluted, or the molecules thereof dispersed, preferably in a body of a hot inert fluid diluent, maintained at a temperature at which the dimer readily vaporizes but at which substantial polymerization of the dispersed molecules of dimer is prevented or inhibited. The dispersion of the dimer in the fluid may be effected in various ways. The dimer, or the mixture containing it, may be concurrently vaporized and diluted with a gaseous or vaporous diluent, or with a liquid diluent which vaporizes at an elevated temperature below that at which substantial depolymerization of the dimer occurs. The diluted vapors then flow rapidly through the depolymerization zone. As effective diluents may be mentioned steam; vapors of organic solvents relatively inert under the conditions of the depolymerization, such as the benzenoid hydrocarbons, i. e. benzene, toluene and xylene; and inert gases, such as nitrogen and carbon dioxide. Among suitable diluents is the mixture of hydrocarbons present in the hydrocarbon fraction boiling above 95° C. isolated from vapors produced by the vapor phase cracking of petroleum oil refinery gases or of natural gas—or such a fraction which has been distilled to concentrate the polycyclopentadienes present therein. Such fractions contain the dimer in admixture with benzene, toluene, xylene, etc.

The dicyclopentadiene may conveniently be depolymerized by slowly introducing it above or below the surface of a heated body of a suitable high boiling inert solvent under conditions where the diene, either alone or in solution in a solvent, is fed to the cracking zone continuously, or in successive small portions. The monomer thus produced is quickly withdrawn from said zone at approximately the rate at which it is formed. When employing this modification of the process, depolymerization temperatures below the boiling point of the solvent preferably are employed—those ranging between 200° C. and 500° C. being especially suitable. The solvent is refluxed or otherwise returned to the reaction zone for reuse. Among high boiling solvents adapted for use in the process may be mentioned the glycol ethers, such as the dimethyl ether of tetraethylene glycol; high boiling hydrocarbon oils; and high boiling esters, such as dibutyl phthalate.

The dispersed dicyclopentadiene or other dimer, either in solution or in vapor phase, then is quickly heated to a suitable depolymerization temperature. The latter varies inversely with the time that the dimer is in contact with the high temperature heating agency. In instances where the dimer is converted to monomer in the presence of a heated organic solvent, the monomer may be flash distilled from said solvent. Any dimer vaporized therewith is condensed and returned to the still. Following this procedure, especially favorable yields of the monomer may be secured using depolymerization temperatures within the range from 200° C. to 500° C. However, in the modification of the process in which the dicyclopentadiene or its equivalent is vaporized in an atmosphere of superheated steam or of an enert gas, and wherein extremely short periods of exposure of the vapors at the depolymerization temperature are employed, temperatures ranging from 200° C. to as high as 800° C. may be used.

It is important that the dimer be dispersed in or diluted with an inert fluid prior to its exposure to temperatures at which a liquid phase polymerization occurs. After the conversion of the dimer to the monomer has been effected, the latter is removed from the cracking zone rapidly enough that further cracking of the monomer is inhibited or prevented. The upper temperature limit for depolymerization of dicyclopentadiene is restricted to that temperature at which further cracking of much of the monomer occurs at the short times of contact practically available. By exposing the dimer vapors to the cracking heat for brief periods of about 0.1 to 0.5 second, depolymerization temperatures as high as 650° C. to 800° C. may be used effectively.

The vapors leaving the depolymerization zone are condensed; and the cyclopentadiene or homologue may be isolated from the condensate by suitable fractionation, preferably under vacuum.

The diluents serve mainly as aids in vaporizing the dimers at a low temperature, thereby preventing further polymerization in the liquid phase. Steam is a preferred diluent—the water condensed following the depolymerization readily being removable from the hydrocarbon components of the reaction products. The use of steam facilitates the rapid heating and vaporization of the starting material under controlled conditions. It also facilitates removal from the starting materials of any resins present therein before the depolymerization step.

While it is preferred to conduct the process at pressures around atmospheric, it is advantageous—particularly when depolymerizing dicyclopentadiene in the absence of a solvent or diluent—to vaporize or disperse the dimer while the same is under subatmospheric pressure, thus facilitating its vaporization at temperatures below those at which substantial polymerization thereof occurs. The vapors then flow continuously to the high temperature zone where the dimer is depolymerized and the monomer is continuously removed substantially as rapidly as formed.

It is not necessary to employ a pure polycyclopentadiene or homologue as starting material in the process. On the contrary, a wide variety of fluid mixtures containing these dimers together with other hydrocarbons and hydrocarbon derivatives may be utilized effectively. Among suitable starting materials may be mentioned (1) the hydrocarbon fraction boiling above 95° C., obtained by fractionating the condensate produced upon cooling and compressing the products of the pyrolysis of hydrocarbon gases such as ethane, propane, and butane at temperatures around 800°–1000° C.; or a dicyclopentadiene concentrate of said fraction produced by steam distillation thereof; (2) a similar fraction obtained during the storage of the liquid fraction from the high temperature carbonization of coal, or from the high temperature pyrolysis of petroleum.

Hydrocarbon mixtures produced in the vapor phase cracking of paraffin hydrocarbons contain diolefines such as butadiene, isoprene, cyclopentadiene, methyl cyclopentadiene, etc. Upon standing, polymerization of the cyclopentadiene and its homologues occurs, forming principally the dimers. Upon distillating the mixture, preferably in vacuum, the substantially pure dimer, or a residue rich in the dimer, may be obtained, other diolefines being removed in the distillation.

The following examples will serve to illustrate the invention:

*Example 1*

In an electrically heated glass vaporizing tube, there were simultaneously fed—at a uniform rate of 200 c.c. of each per hour—(1) water; and (2) a hydrocarbon mixture containing dicyclopentadiene, methyl dicyclopentadiene, and higher polymers, together with other hydrocarbons, and produced by the high temperature vapor phase pyrolysis of a mixture of the lower paraffins, ethane, propane and butane. The vapors leaving the vaporizer were conducted at a rapid rate through an empty reaction tube one inch in diameter and thirty inches long, wherein the vapors were heated to a temperature of about 400° C., the flow rate being such that the vapors were at the reaction temperature for about 2.5 seconds. Substantially no resin deposited in the reaction tube; and approximately 90% of the dicyclopentadiene present in the hydrocarbon material was converted to the monomer. During vaporization of the mixture with steam, small amounts of resins present in the hydrocarbon mixture accumulated in the vaporizer as an emulsion with water. This emulsion was withdrawn periodically.

The vapors leaving the reaction zone were condensed, the hydrocarbon layer of the condensate was separated from the aqueous layer, and substantially pure cyclopentadiene was recovered from the hydrocarbon layer by distillation under vacuum. Both the steam and the hydrocarbons functioned as diluents in the process.

Following the general procedure of Example 1, but wherein the steam was also utilized for atomizing the hydrocarbon mixture at the mouth of the reaction tube by use of a spray nozzle, results similar to those of Example 1 were secured.

*Example 2*

Pure dicyclopentadiene was fed at a uniform rate of 0.4 gallon per hour to an atomizer wherein it was atomized with steam at 150° C., fed at a rate corresponding to 0.4 gallon of water per hour, and the vapors were discharged at high velocity into a heated iron reaction tube one inch in diameter and twenty-two feet long. At the feed rates used, the mixture was at the cracking temperature for a period of about 3 seconds. Under these conditions, between 90% and 95% of the dimer was converted to the monomer, at a vapor temperature of 200° C. in the reaction zone.

*Example 3*

Pure dicyclopentadiene was passed at a rate of 1.5 gallons per hour through the iron reaction tube of Example 2, heated to provide a vapor temperature of around 200° C. The dicyclopentadiene was flash vaporized at the inlet end of the tube, and the vapors were quickly withdrawn from the outlet after a period of contact of about 3 seconds, calculated on the monomer, at said depolymerization temperature. About 85% to 90% of the dicyclopentadiene was recovered as the monomer.

Example 4

The fraction boiling above 100° C. at atmospheric pressure of the condensate from the vapor phase cracking of natural gas, and containing dicyclopentadiene and hydrocarbon diluents, was vaporized and the vapors rapidly passed at a rate of 300 cc. per hour through a vertical one-inch glass tube thirty inches long, containing broken pieces of porous silica, and maintained at a temperature of 320° C. by means of an electrically heated jacket. The effluent vapors were condensed. About 85% to 95% of the dicyclopentadiene was cracked to the monomer.

Example 5

Dicyclopentadiene was vaporized at a rate of 400 cc. per hour with superheated steam at 250° C. in amount equivalent to 1400 cc. of water per hour. The mixed vapors were passed through a one-inch diameter iron pipe or reaction chamber thirty-four inches long heated to maintained a vapor outlet temperature of 650° C. at such rate that the time required for passage of the vapors through the reaction chamber was approximately 0.16 second. The outlet vapors were condensed, and the condensate redistilled, yielding cyclopentadiene equivalent to 88% of the dimer fed to the reaction chamber. Upon increasing to around 0.5 second the time during which the vapors are in the high temperature chamber, at the aforesaid temperature, the yield of the monomer is somewhat reduced.

Example 6

Three hundred grams of the dimethyl ether of tetraethylene gylcol were maintained at a temperature of from 250° C. to 300° C. in a distillation vessel, provided with a reflux column, while dicyclopentadiene was introduced continuously into the said glycol ether at a rate of 400 cc. per hour. The dimer tended to flash distill from the body of solvent with the cyclopentadiene. The monomer was continuously withdrawn from the distillation vessel at about the rate of its formation, and that at which the dimer was fed to the glycol ether. Small amounts of dimer flash vaporized from the hot glycol ether were refluxed and returned to the distillation vessel. The cyclopentadiene was secured in high yields.

Example 7

A stream of dicyclopentadiene was vaporized at temperatures of 68°–70° C. under an absolute pressure of about 23 mm. of mercury. The dimer vapors were fed at a constant rate through an iron cracking tube one inch in diameter, while maintaining the tube at a temperature within the range between 350° and 380° C., and under an absolute pressure of 10 mm. of mercury. During 1⅔ hours, 535 grams of products left the tube and were condensed. A cracking efficiency of 94% was obtained.

The depolymerization process of the present invention, preferably effected entirely in the attenuated phase, provides the noteworthy advantage over the prior slow liquid phase cracking operation, wherein cracking heat is applied to the liquid dimer, of having an efficiency near 100%. Moreover, the rate of conversion of the dimer to monomer is considerably higher than in prior known liquid phase depolymerizations.

The process may be employed for the depolymerization of other polymers of cyclopentadiene and its homologues, such as di(methyl cyclopentadiene), methyl dicyclopentadiene, and tricyclopentadiene.

Figure 1:
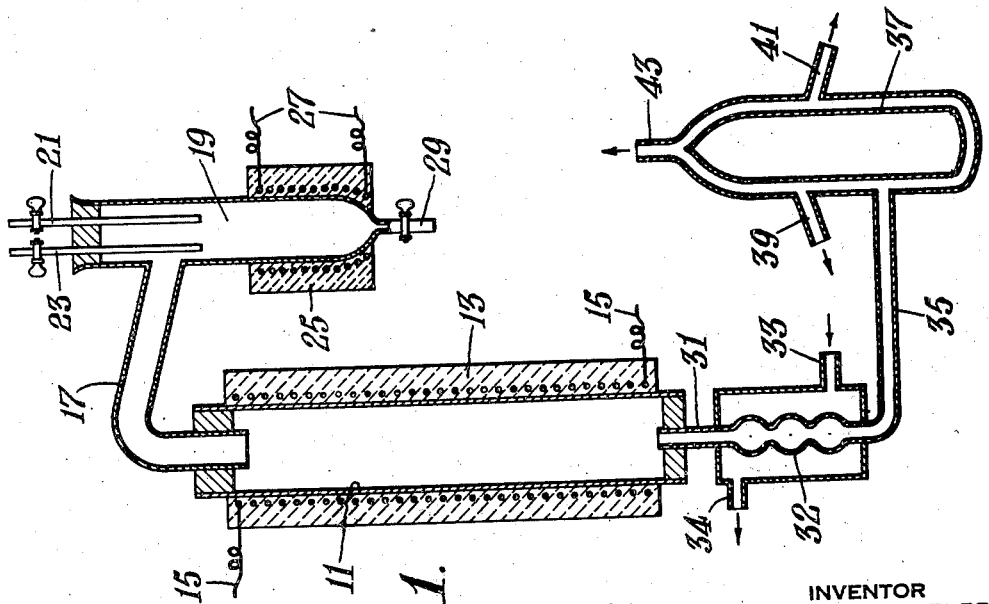

In the accompanying drawing, Fig. 1 illustrates diagrammatically a form of apparatus suitable for use in the process; and Fig. 2 shows diagrammatically a form of apparatus useful with another modification of the process.

Referring to Fig. 1, numeral 11 designates a depolymerization or cracking tube, extending within a furnace housing 13 of refractory material provided with electric heating means 15, and supported in suitable manner, not shown. The upper end of the tube 11 is connected through conduit 17 with a mid-portion of a closed vaporizing chamber 19 having associated therewith a valve-controlled conduit 21 for conducting to the vaporizer the hydrocarbon to be cracked. The vaporizer 19 also is provided with a valve-controlled conduit 23 for conducting thereto an inert gaseous or vaporous diluent, or water in the case where steam is to be employed as diluent. Surrounding the lower portion of the vaporizer 19 is a refractory housing 25 provided with an electric heating element 27. The lower end of the vaporizer 19 is provided with a valve-controlled outlet conduit 29 through which resinous polymers may be withdrawn as desired.

The discharge end of the cracking chamber 11 is connected through conduit 31 with a condenser 32 having the usual inlet 33 and outlet 34 for a cooling medium such as water. The condenser outlet is connected through line 35 with a decanter 37. The latter has an outlet 39 for the hydrocarbons present, and an outlet 41 for water formed where steam is used as a diluent. The upper end of the decanter 37 may be connected through a gas outlet line 43 with a suitable means for creating a vacuum in the system; or it may be open to the atmosphere.

The apparatus illustrated diagrammatically in Fig. 2 may be employed in connection with the modification wherein the dicyclopentadiene is introduced below the surface of a heated body of a high-boiling inert solvent. Numeral 51 designates a still housed within a heat-insulated housing 53 provided with electric heating means 55. A liquid inlet conduit 56, having the valve-controlled branch lines 57 and 59 connected therewith, extends within the still 51 and has its outlet end near the bottom of the still. The outlet of the still 51 is connected with a reflux condenser 61 which is provided with the usual inlet 63 and outlet 65 for a cooling fluid. A vapor outlet from this reflux condenser is connected through line 67 with a condenser 69 similar to condenser 32 of Fig. 1. The outlet 71 from condenser 69 may be connected with a decanter or separator (not shown), which may be similar to the decanter 37. The gas outlet from such decanter may be connected, if desired, with a vacuum pump. It will be evident that other types and arrangements of apparatus capable of carrying out the process may be utilized instead of that shown without departing from the spirit of the invention.

The term "a cyclopentadiene" is used in the accompanying claims to designate both cyclopentadiene and its homologues. Similarly, the term "a dicyclopentadiene" is intended to designate dicyclopentadiene and the dimers of the homologues of cyclopentadiene.

The invention is susceptible of modification within the scope of the appended claims.

I claim:

1. Process for producing a cyclopentadiene, which comprises continuously passing a flowing stream of superheated vapors of a dicyclopentadiene dispersed in an inert non-liquid fluid diluent through a depolymerization zone maintained at a temperature of at least 200° C. but below the temperature at which substantial decomposition of the monomer occurs, thereby effecting depolymerization of said dicyclopentadiene, and quickly removing the resultant monomer vapors from said zone as formed while inhibiting further polymerization of the dicyclopentadiene.

2. Process for producing a cyclopentadiene, which comprises vaporizing and superheating successive portions of a flowing stream of a dicyclopentadiene dispersed within an inert non-liquid fluid diluent at a temperature below that at which substantial polymerization thereof occurs, briefly heating the stream of superheated vapors in a depolymerization zone to a temperature of at least 200° C. but below the temperature at which substantial decomposition of the resultant monomer occurs, and rapidly removing the resultant monomer from the depolymerization zone as formed while inhibiting further polymerization of the dicyclopentadiene.

3. Process for producing a cyclopentadiene which comprises rapidly and continuously depolymerizing successive portions of a flowing stream of superheated vapors of a dicyclopentadiene in admixture with superheated steam at a temperature of at least 200° C. but below the temperature at which substantial decomposition of the monomer occurs, and removing the resultant cyclopentadiene from the depolymerization zone as rapidly as formed while inhibiting further polymerization of the dimer.

4. Process for producing a cyclopentadiene, which comprises continuously vaporizing and superheating a flowing stream of a mixture of a dicyclopentadiene and water, rapidly heating the resultant stream of superheated vapors to a depolymerization temperature of at least 200° C. but below the temperature at which substantial decomposition of the cyclopentadiene occurs, and removing the resultant monomeric diene from the depolymerization zone sufficiently rapidly that further polymerization of the dicyclopentadiene is inhibited.

5. Process for producing a monomeric diene selected from the group consisting of cyclopentadiene and the alkyl cyclopentadienes from the corresponding dimer, which comprises continuously passing through a depolymerization zone maintained at a temperature between 200° C. and the temperature at which substantial decomposition of the corresponding monomer occurs, a stream of superheated vapors of a hydrocarbon mixture containing such a dimer and at least one of the lower benzenoid hydrocarbons of the class consisting of benzene, the toluenes and the xylenes, and removing from such zone the resultant monomer sufficiently rapidly that substantial further polymerization of the dimer is inhibited.

6. Process for producing a monomeric diene selected from the group consisting of cyclopentadiene and the alkyl cyclopentadienes from the corresponding dimer, which comprises continuously passing a stream of superheated vapors of said dimer, dispersed in an inert non-liquid fluid diluent, through a depolymerization zone maintained at a temperature within the range between 200° C. and 800° C., and rapidly removing the resultant monomeric diene from the depolymerization zone as formed while inhibiting further polymerization of the dimer.

7. Process for producing a cyclopentadiene, which comprises rapidly and continuously flowing a stream of superheated dicyclopentadiene vapors dispersed in a vaporous or gaseous diluent through a reaction zone maintained at a depolymerization temperature within the range from 200° C. to 800° C., quickly withdrawing the vaporous reaction mixture from the reaction zone sufficiently rapidly that substantial cracking of the cyclopentadiene therein is inhibited, and recovering therefrom the cyclopentadiene present therein.

8. Process for producing a cyclopentadiene, which comprises continuously dispersing a flowing stream of superheated vapors of a dicyclopentadiene in a non-liquid fluid inert thereto, while at a temperature below that at which substantial polymerization of the dicyclopentadiene occurs, rapidly conducting a flowing stream of the dispersed superheated dicyclopentadiene vapors through a depolymerization zone maintained at a high temperature within the range between around 200° C. and 800° C., thereby depolymerizing the dicyclopentadiene and forming the corresponding monomer, and immediately thereafter cooling said stream of vapors and isolating said monomer, thereby inhibiting further polymerization of the dicyclopentadiene and substantial further cracking of said monomer.

9. Process for producing a monomeric diene selected from the group consisting of cyclopentadiene and the alkyl cyclopentadienes from the corresponding dimer, which comprises continuously passing a stream of superheated vapors of said dimer, dispersed in steam, through a depolymerization zone maintained at a temperature within the range between 200° C. and 800° C., and rapidly removing the resultant monomeric diene from the depolymerization zone as formed while inhibiting further polymerization of the dimer.

10. Process as defined in claim 7, wherein the said diluent is superheated steam.

11. Process for producing a cyclopentadiene, which comprises continuously vaporizing and superheating successive portions of a flowing stream of a dicyclopentadiene in contact with steam at a temperature below that at which substantial depolymerization of the dicyclopentadiene occurs, rapidly heating the resultant stream of superheated vapors to a depolymerization temperature within the range from 200° C. to 800° C. for a brief period insufficient to cause substantial further cracking of the cyclopentadiene formed at the said temperature, while inhibiting substantial further polymerization of the dicyclopentadiene and immediately thereafter condensing the vaporous reaction mixture, and isolating from the condensate the cyclopentadiene present therein.

12. Process for producing a monomeric diene selected from the group consisting of cyclopentadiene and the alkyl cyclopentadienes from the corresponding dimer, which comprises continuously passing through a depolymerization zone maintained at a temperature within the range between 200° C. and 800° C. a stream of superheated vapors of such dimer containing vapors of at least one of the lower benzenoid hydrocarbons of the class consisting of benzene, the toluenes and the xylenes, and rapidly removing the resultant monomeric diene from the depolymerization zone sufficiently rapidly that substantial polymerization of the dimer is inhibited.

13. Process for producing a cyclopentadiene, which comprises rapidly and continuously flowing through a depolymerization zone maintained at a temperature within the range between 200° C.

and 500° C., successive portions of a flowing dispersion of superheated vapors of a dicyclopentadiene in a non-liquid inert fluid diluent, said dispersion being produced and maintained, prior to introduction into said depolymerization zone, at an elevated temperature at which the dimer readily vaporizes but at which substantial further polymerization of the dispersed particles of the latter is prevented, and rapidly removing from the depolymerization zone the cyclopentadiene vapors thus produced substantially as rapidly as formed, while inhibiting further cracking of the latter and further polymerization of the dicyclopentadiene.

14. Process for producing a monomeric diene selected from the group consisting of cyclopentadiene and the alkyl cyclopentadienes from the corresponding dimer, which comprises subjecting a flowing stream of superheated vapors of said dimer, in admixture with steam, to a temperature between around 225° C. and around 800° C., for a period of time ranging between one-tenth of a second and several seconds.

15. A method of producing cyclopentadiene from dicyclopentadiene in vapor phase which comprises subjecting superheated dicyclopentadiene vapor in the presence of steam to temperature conditions between 350° C. and 450° C. and for a time of contact between 1 second and 3 seconds.

CHARLES EUGENE STAFF.

REFERENCES CITED

The following references are of record in the file of this patent:

UNITED STATES PATENTS

| Number | Name | Date |
|---|---|---|
| 1,640,975 | Brown | Aug. 30, 1937 |
| 1,752,004 | Jaqua | Mar. 25, 1930 |
| 2,026,731 | Dreyfus | Jan. 7, 1936 |
| 2,196,363 | Robertson | Apr. 9, 1940 |
| 2,211,038 | Ward | Aug. 13, 1940 |

FOREIGN PATENTS

| Number | Country | Date |
|---|---|---|
| 467,932 | Great Britain | June 25, 1937 |

OTHER REFERENCES

Khambata et al., Jour. Chem. Soc., March 1939, pages 375–381.

Schultze, Cham. Abs., vol. 32, 8741 (1938).

Harkness et al., Jour. Chem. Physics, vol. 5, 681–6 (1937).

Khambata et al., Nature, vol. 137, 496–7 (1936).

Kistiakowsky et al., Jour. Am. Chem. Soc., vol. 58, 148 (1936).

Egloff, The Reactions Of Pure Hydrocarbons; published by Reinhold Pub. Corp. (1937), New York, 708–713.